United States Patent [19]
Hanson

[11] 3,833,243
[45] Sept. 3, 1974

[54] TRAILER HITCH FOR ATTACHMENT TO TOW VEHICLE AXLE

[76] Inventor: Carl J. H. Hanson, P.O. Box 312, Buffalo, S. Dak. 57720

[22] Filed: Apr. 20, 1973

[21] Appl. No.: 352,881

[52] U.S. Cl............... 280/477, 280/478 R, 280/503
[51] Int. Cl............................................. B60d 3/00
[58] Field of Search................ 280/503, 478 R, 477

[56] References Cited
UNITED STATES PATENTS

| 1,118,236 | 11/1914 | Roedel............................... 280/503 |
| 1,412,834 | 4/1922 | Bleoo.................................. 280/503 |
| 2,430,906 | 11/1947 | Burt............................... 280/503 X |
| 2,743,118 | 4/1956 | Dotson............................ 280/478 R |

*Primary Examiner*—Robert R. Song

[57] ABSTRACT

A trailer hitch includes a transverse yoke with adjustable means for attaching it to tow vehicle axles of various lengths and configurations; a swivelled hollow ring, offset from the vertical axis about which it swivels is fastened in the middle of the yoke; a tongue bearing a collapsible pair of arms carry at their front ends ball members having reduced neck section which engages the opening in the swivelled ring for firm pulling and pushing engagement. Toggle means are provided for spreading the arms apart and locking them in engagement in the ring, pivoted guiding gate means direct the arms, when collapsed together, into the ring opening. A lever and a sliding control bar attached thereto arranged to selectively spread or close the arms with respect to each other to latch or unlatch the neck portions of the arms in the ring member. The trailer tongue is pivoted for movement in a vertical plane, including compression springs to absorb road shocks and to cushion the trailer load as applied to the two vehicle axle by the tongue.

10 Claims, 4 Drawing Figures

PATENTED SEP 3 1974                                        3,833,243
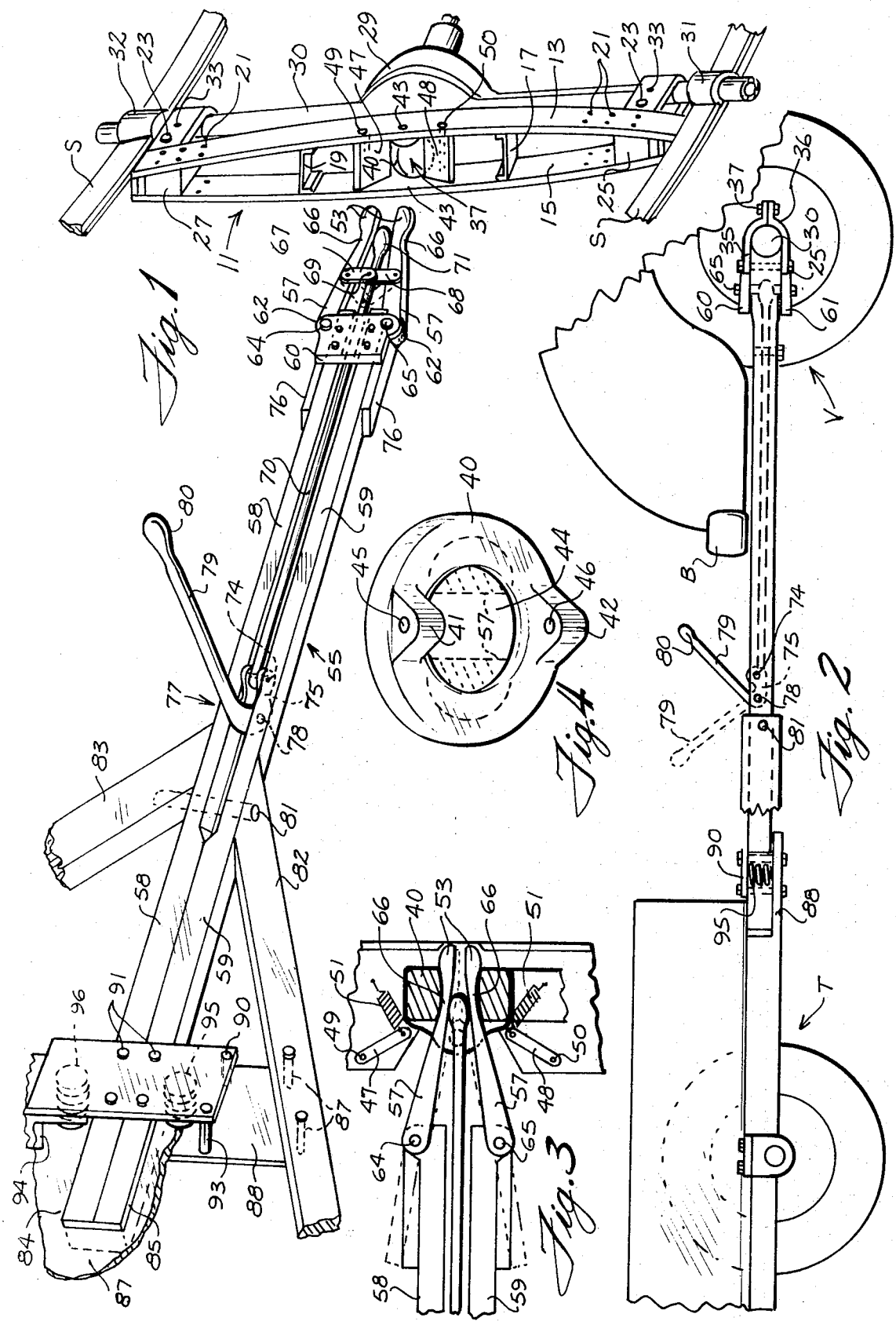

TRAILER HITCH FOR ATTACHMENT TO TOW VEHICLE AXLE

BACKGROUND AND PRIOR ART

Most trailer hitches of the prior art have been designed for attachment to the rear bumper of the car or other tow vehicle. Some hitches have been designed for attachment to a frame member at the rear of the tow vehicle, other than the rear bumper, but nearly all have been attached to the tow vehicle at a point substantially removed from and behind the rear axle. This has been largely a matter of convenience. It is well known that such an attachment has undesirable consequences; the rear of the tow vehicle itself, being mounted on flexible springs, tends to sway and to plunge down and up in travel over rough roads; side winds augment these unstable forces and tend to make trailer travel hazardous. A number of suggestions have been made in the past for attachment of the trailer hitch to other parts of the tow vehicle. For example, recent designs have called for attaching the trailer to a hitch located on top of the tow car, since the middle part of the car is more stable, and less subject to vertical as well as side sway, than the rear bumper. Such a connection, obviously, requires that the tongue have a long "goose neck" capable of reaching up on top of the tow vehicle. Analogous arrangements have been devised for attaching a trailer to the bed or body of a truck type vehicle, such as the popular and widely used pick-up trucks. Such an attachment has some advantages in giving greater stability to the trailer and permitting turning on short radius, etc., but they interfere with load placement in the truck and are often inconvenient for this reason. Also, as in the case of the car-top hitch, they require the use of a long and relatively expensive and heavy "goose neck" tongue, extending up, over, and into the cargo compartment of the truck.

Some suggestions have been made in the past, also, for attachment to the rear axle of the tow vehicle. As noted above, these have not been widely accepted because of the inconvenience of securing or latching the hitch and unlatching, often requiring that the user crawl under the tow vehicle to hitch or unhitch the trailer. Attachment to the rear axle has obvious advantages, permitting closer coupling than bumper hitches and putting the front end weight of the trailer directly on the rear axle of the tow vehicle and not on its spring suspension system. As noted above, attachment to the spring-suspended parts of the tow vehicle contributes to swaying and other handling instability in the trailer. It also subjects the car suspension system to extra loading, which is often objectionable, causing the tow vehicle to run low, reducing its road clearance and otherwise contributing to discomfort of passengers in the tow vehicle.

Some suggestions for attachment of a rigid trailer tongue to the rear axle of the tow vehicle have ignored the fact that this subjects the rear axle to additional unspring loading, which is always undesirable. Other suggestions have involved complex means for providing some sort of spring suspension or shock absorption of the trailer load, as applied to the car rear axle.

The present invention has several objects which include solving most of the objections raised above. It facilitates closer hook-up, with consequent better control over the trailer, it eliminates overloading the suspension system of the tow vehicle, but it still provides means for absorbing load and road shock between the trailer and the rear axle of the tow vehicle. It provides simple and convenient means for guiding the parts into connecting position and locking them or unlocking them without having to get under the tow vehicle. It is adaptable to many and various types of tow vehicles. Other advantages will appear as this description proceeds.

BRIEF DESCRIPTION OF DRAWINGS

FIG. 1 is a perspective view of a preferred form of the hitch of the invention.

FIG. 2 is a side view on a smaller scale, showing parts of the vehicles.

FIG. 3 is a top view, on a larger scale, of the front hitch arms and associated parts.

FIG. 4 is an enlarged detail view of the hollow hitch ring member.

DESCRIPTION OF PREFERRED EMBODIMENT

The hitch of the present invention is adapted to be attached directly to the rear axle of a standard car, automobile, or truck. By reason of this direct attachment of the axle, undesirable and dangerous play and side sway of the trailer, and its transmission of disturbing forces to the tow vehicle are eliminated. The system of attaching to the axle is much superior to conventional hitches which attach to or near the rear bumper of the tow vehicle. In addition, the closer coupling gives closer control, permits shorter turns, and facilitates backing the trailer under control of the tow vehicle.

A strong yoke member 11 adapted for securement to the axle at or near the points where the spring shackles normally are fixed, is made up of an upper bar 13, a lower bar 15, and connecting bars or spacers 17 and 19 all securely fixed together. At each end, bars 13 and 15 are provided with a series of holes 21 through which bolts 23 may be inserted to secure in place, adjustably along the bars, the axle abutting blocks 25 and 27. That is, the spacing between blocks 25 and 27 may be varied to accommodate various axle lengths or spacings between the spring shackles 31 and 32 on axle 30, as well as to suit various axle configurations. The blocks 25 and 27 also can be adjusted so as to fit their front ends firmly against the axle 30, with various sizes and arrangements of the differential housing 29. It is preferred to attach the yoke 11 as near as convenient to the spring shackles; at these points, of course, the driving force is transmitted to the tow vehicle V.

Blocks 25 and 27 are provided with plural holes 33 for various spacings of yoke 11 from the axle 30, to accommodate the differential housing and to hold the yoke 11 against it or as near thereto as convenient. The middle part of the yoke supports a socket or ring member 40, to which arm or bar connections 57, described further below, and having ball or enlarged end portions 53 are to be secured when the trailer is to be pulled. The front ends of blocks are concave in shape to fit snugly and neatly against the rear of the average axle and to fit other axles of other diameters or shapes at least reasonably well. See block 25, FIG. 2. A strap or band fastens each block to the axle with security; see straps 35, 36 and bolt 37 at the front of FIG. 2. Instead of a band, a chain may be used, provided it is tightened to eliminate or at least to minimize slack around the axle, as will be obvious.

Midway or approximately midway between the ends of the yoke 11, a swivel socket or ring 40 is pivotally mounted on a vertical axis. The ring is offset ahead of this axis. Pivot pins or bolts 43 pass through openings 45, 46, provided respectively in upper and lower ears 41 and 42 formed integrally with the ring 40. See FIG. 4. These pins or bolts are mounted in the upper and lower plates, respectively, to permit the ring or tow socket 40 to swing about the vertical pivot axis defined by them. The ring then can swing freely through a wide angle, as may be needed for towing the trailer T in short radius. The socket or swivel mounted ring 40, thus mounted eccentrically or offset from the pivot axis, swings into line to facilitate attachment of the trailer from various directions over a wide angle. As seen in FIG. 4, particularly, the ring is of doughnut or roughly toroidal shape and its large central opening is ample to receive the hemispherical "ball" end connections 53, 57 when these are brought close together, as they are shown in dotted lines in FIG. 3.

A pair of swinging guide plates 47 and 48 are pivoted to the upper and lower yoke bars 13 and 15 at their outer edges, to swing, gate-like, with their free ends close to or touching the near facing parts of ring 40. Pivots pins or bolts 49, 50, hold them to the yoke 11. One or more tension springs 51, connected between the free end of each of the plates 47 or 48, and a suitable anchor point on the yoke, tend to swing the plates against the ring member 40 to guide the end of the trailer tongue into the opening 44 in this ring, even if it is somewhat misaligned, to the right or the left. This facilitates connecting the trailer to the tow Vehicle V.

The hemispherical or ball members 53 are similar, except for being right and left mirror images of each other. These arms are pivoted on vertical axes to the front ends of parallel bars 58 and 59 which together constitute the trailer tongue 55. An upper plate 60 and a lower plate 61 are fastened to the two bars or tongue members 58 and 59; each of these plates has an ear 62 which receives a pivot bolt 64 or 65, on which the connector bars 57 are mounted. The front end of each of these bars is roughly hemispherical in shape, as noted above; behind the hemispherical ball portion 53 the bars are necked in at 66 to fit neatly into and around the opening 44 of toroidal ring 40 when moved to expanded position, as shown in full lines in FIGS. 1 and 3. A pair of links 67, 68, secured at their meeting ends at 69 to the slidable bar 70, have their outer ends pivotally connected to the respective hitching bars 57. When the slidable bar 70 is pushed to its forward position, as shown in full lines in FIGS. 1 and 3, the links 67, 69 are substantially in alignment and opposed to each other, pushing bars 57 away from each other so that the necked portions 66 firmly engage the ring 40. It is preferred that the center pivot 69 move a very small distance beyond center or straight link alignment, so that the links 67, 69 act as a toggle, holding the necked portions 66 locked to the ring 40. In addition to these links, the operating bar 70 has its forward end widened and cam shaped at 71; see FIG. 3. When pushed to its forward position, this portion 71 cooperating with cam surfaces on the inner facing surfaces of bars 57 spreads them apart to the maximum extent and further locks them in the holding position or securely latched position.

Bar 70 is pivoted at 74 to and is operated by the short arm 75 of a lever 77 pivoted on a horizontal axis provided by a pin or shaft 78 mounted in the parallel bars 58 and 59 which comprise the trailer tongue. A longer operating lever arm 79 is provided with a handle 80 to selectively swing the short arm 75 into its full line horizontal position, to push the bar 70 to its forward position, or to withdraw the bar 70 and links 67, 68, to the dotted line position, to thus retract the arms 57 towards each other. The latter operation breaks the toggle formed by links 67 and 68; it also retracts the cam head element 71 from between the ball portions 53 of arms 57, 58, allowing these ball portions to come together. This releases the necked portions 66 from the ring and unhitches the trailer tongue from the yoke 11.

When the lever 77 is in the forward position, as shown in full lines, short arm 75 passes slightly below dead center with respect to slide bar 70 and this serves further to lock the arms 57 to the ring 40. If desired, a detent latch, not shown, may be provided on lever 77 to lock it more positively in the forward position, further insuring against any accidental or unintentional release of the ball and ring connect, as when the trailer is being towed.

At their rear ends, behind pivot pins 64 and 65, the arms 57 have extensions 76 which swing tightly against the sides of the tongue members 58 and 59 when the front ends of the latter are separated by forward movement of the operating bar 70, as described above. This stiffens and rigidifies the front end of the tongue assembly. The tongue assembly is thus made somewhat flexible at the front, when the two ball members 53 are brought together for insertion into the opening 44 in ring 40. This feature, in addition to the swinging guides or gates 47 and 48, assists in guiding the tongue into latching position when the tow car is backed towards the trailer or when the trailer is pushed towards hitching position.

The arrangement described so far attaches the tongue directly to the tow vehicle drive axle, making a shorter and more direct attachment and avoids the swinging and swaying that often accompanies the conventional bumper hitch. It also places the weight of the tongue, the front end trailer load, directly on the axle and does not burden the tow car suspension with this added weight. This is a decided advantage. However, unless provision were made for some sort of spring suspension, the unsprung dead weight of the trailer tongue applied to the rear axle of the tow vehicle could be objectionable.

To avoid application of the added unsprung tongue weight to the axle, the tongue 55 is pivoted at a point intermediate of its length on a cross pin or shaft 81 which passes through the trailer frame and bracing elements 82, 83. The rear end of the tongue is free to swing up and down in a channel provided to confine it against lateral movement. This channel, which has side walls 84, 85, is formed in a block or box structure 86 secured firmly to a rigid bottom plate 88 which constitutes part of the trailer frame. The latter is fastened to the trailer frame, as by bolts 87 secured in the frame members 82 and 83 (not completely shown) and/or in any other frame members conveniently available.

A separate upper plate 90 is bolted to the tongue elements 57, 58, at 91, with its ends extending to the right and left of the tongue. Slidable bolts or rods 93, 94 pass through the outer corners of the plate 90 and through the lower plate 88 to limit the relative upward movement of plate 90 and the tongue parts connected to this plate, thus limiting clockwise movement of the tongue about its pivot shaft 81. A pair of strong compression springs 95, 96, tend to force plate 90 upwardly; the trailer load on the tongue tends to compress these springs, through plate 90. The effective length of bolts 93, 94 can be adjusted to put the springs 95 and 96 under compression to the extent desired, in order that road shocks will be properly absorbed by the springs. If desired, other shock absorber mountings, including fluid piston means, may be included to further control and absorb road shock.

With the present invention, as described, several important advantages are obtained with a relatively simple assembly. The tongue is easily guided into the tow means at the yoke; the trailer is closely coupled to the tow vehicle and this facilitates handling on the highway as well as in close quarters, backing, turning, etc. Trailer load is removed from the tow vehicle suspension system; side sway which results from typical bumper tow mechanism is entirely eliminated. The latter is a very important safety feature. The latching lever is conveniently located between the trailer body and the tow vehicle; the offset swivel mounting of the tow ring 40 permits the trailer to be connected from various positions over a wide angle behind the tow vehicle. This offset relationship itself further facilitates guiding the trailer tongue into latching position.

It will be evident that modifications suggested above and many others not suggested but obvious to those skilled in the art may be made without departing from the concept and spirit of the present invention. It is intended by the claims which follow to cover such modifications and the various equivalent means that may occur to those skilled in the art, as broadly as the state of the prior art properly permits.

What is claimed is:

1. A trailer hitch for attaching a trailer having a tongue to a tow vehicle at the rear axle of said tow vehicle, which comprises, in combination, a transverse yoke member, means adjustable in said yoke member for securing said yoke to said rear axle of said tow vehicle, a hollow member swivel mounted in said yoke and having an opening for receiving the front end part of said trailer tongue, releasable interlocking means on said front end part of said tongue for firmly engaging within said swivel mounted hollow member, lever means mounted on said tongue remote from said interlocking means and connected to said interlocking means for selectively engaging or disengaging the locking means with or from said swivel mounted hollow member, pivot means securing the tongue to the trailer for pivotal movement substantially in a vertical plane, and limit stop means for controlling said pivotal movement and including a resilient means for absorbing shock forces applied by the trailer to said tongue.

2. A trailer hitch according to claim 1 in which the hollow member is a ring of generally toroidal configuration swivelled on a vertical pivot axis in said yoke member.

3. A trailer hitch according to claim 1 in which the hollow member is a toroidal ring swivelled on and offset from a vertical axis through ears which project rearwardly from the ring to assist in guiding the trailer tongue into latching position within said ring.

4. A trailer hitch according to claim 1 in which a swinging guide plate or gate is mounted in the yoke on either side of the swivelled hollow member to assist in guiding the tongue into latching position in said hollow member.

5. A trailer hitch according to claim 1 in which the hollow member is a toroidal ring and the interlocking means on the tongue comprise a pair of forwardly extending arms pivoted to the tongue for limited swinging movement, each arm having an enlarged rounded front end and a necked-in portion behind said front end shaped to engage an inner toroidal surface of the ring.

6. A trailer hitch according to claim 1 in which the tongue is pivoted to the trailer frame on a transverse horizontal axis at a point intermediate its ends and wherein spring means cushion the rear end of the tongue to absorb road shock and prevent its transmission to the axle of the tow vehicle.

7. A trailer hitch according to claim 1 in which the transverse yoke includes swinging guide gate means on either side of the hollow member for assisting in introducing the trailer tongue into latching position in said hollow member and resilient means holding said gate means in guiding position but permitting said gates to swing laterally within limits.

8. A trailer hitch according to claim 1 in which the interlocking means consist of a pair of arms pivoted on vertical axes to the front ends of the trailer tongue and wherein said arms have rearwardly extending portions serving as stops to limit lateral swinging motion of said arms about said axes.

9. A trailer hitch according to claim 1 in which the interlocking means comprise a pair of arms pivoted to the front end of the trailer tongue, means for limiting their pivotal movement, a slidable central member for holding said arms in a locking position spaced from each other, and a control lever for operating said slidable member to selectively expand the arms to locking position or to contract them to a release position.

10. A trailer hitch according to claim 9 in which the control lever is pivoted to the tongue and is adapted to move into a locking toggle position to insure locking of the hitch in travel position.

* * * * *